J. T. SCHMITT.
SHOCK ABSORBER.
APPLICATION FILED OCT. 13, 1917.
1,278,030.
Patented Sept. 3, 1918.
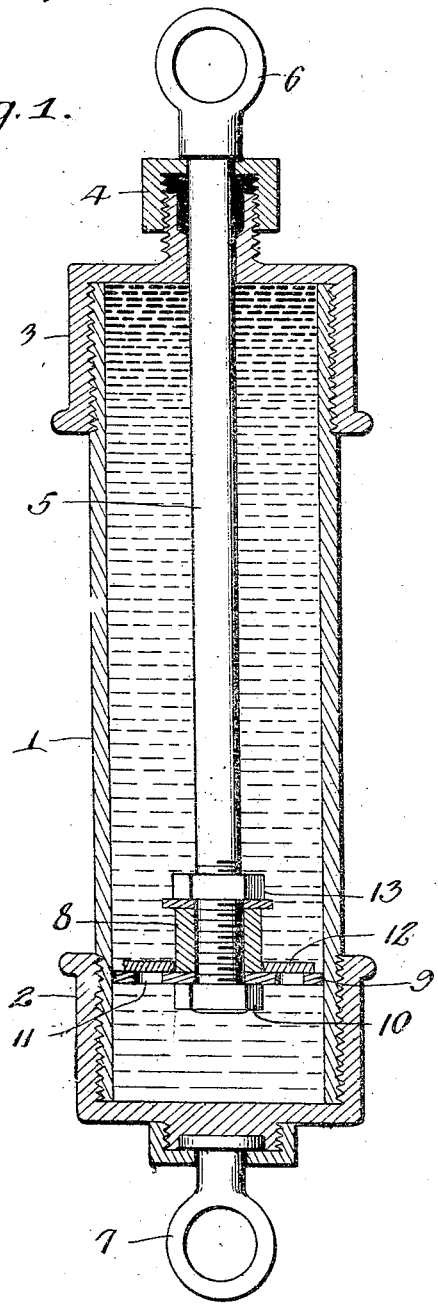
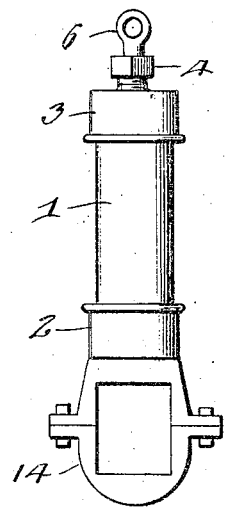
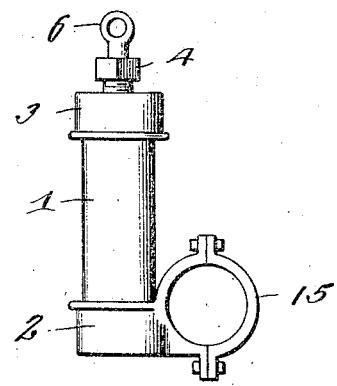
INVENTOR
J. T. Schmitt,
BY Victor J. Evans
ATTORNEY

UNITED STATES PATENT OFFICE.

JOSEPH T. SCHMITT, OF CULLMAN, ALABAMA.

SHOCK-ABSORBER.

1,278,030.

Specification of Letters Patent. Patented Sept. 3, 1918.

Application filed October 13, 1917. Serial No. 196,482.

*To all whom it may concern:*

Be it known that I, JOSEPH T. SCHMITT, a citizen of the United States, residing at Cullman, in the county of Cullman and State of Alabama, have invented new and useful Improvements in Shock-Absorbers, of which the following is a specification.

This invention relates to improvements in shock absorbers and especially of that type which is adapted for use upon automobiles and other vehicles which are subject to heavy jolts, the object of the invention being to provide an improved shock absorber adapted to be connected to an axle and to a spring and to check the recoil of the spring.

The invention consists in the construction, combination and arrangement of devices hereinafter described and claimed.

In the accompanying drawings:—

Figure 1 is a vertical sectional view of a shock absorber constructed and arranged in accordance with my invention.

Figs. 2 and 3 are detailed elevations showing modifications in the construction of my shock absorber.

In the embodiment of my invention I provide a cylinder 1 which is provided at the lower and upper ends with caps 2, 3 respectively and which are screwed thereto. The upper cap 3 is provided with a stuffing box 4, through which extends a plunger rod 5. The plunger rod has an eye 6 at its upper end adapted to be connected to an automobile spring. An eye 7 is swivelly connected to the lower cap and is adapted to be connected directly to the axle.

The cylinder is filled with oil or other suitable liquid. The lower portion of the plunger rod is threaded. A sleeve 8 is arranged on the lower portion of the plunger rod. A plunger 9 which is of slightly less diameter than the bore of the cylinder is secured to the plunger rod between the lower end of the sleeve and a nut 10 which is screwed to the plunger rod. Said plunger has openings 11 of suitable size in opposite sides. A valve element 12 which is here shown as a washer is arranged for vertical movement on the sleeve to and from the plunger and its upward movement is checked by a nut 13 which is screwed on the plunger rod and bears on the upper end of the sleeve, said sleeve being firmly held between the two nuts as will be understood.

The operation of my improved shock absorber is as follows. On a downward movement of the spring the plunger is moved downwardly thereby, the openings in the plunger permitting the passage of oil therethrough and the valve rising so that said openings are unobstructed. Such downward movement of the plunger is comparatively free and does not impede the corresponding movement of the spring. On the rebound or upward movement of the spring, however, the valve closes downwardly on the plunger, cutting off the passage of oil through the openings in the plunger and hence the plunger is checked and is permitted to move upward at a comparatively low rate of speed, the oil displaced by the upward movement of the plunger passing between the plunger and the wall of the bore of the cylinder. Hence the rebound of the spring is effectually checked and the shock absorbed.

My improved shock absorber is extremely cheap and simple, may be readily assembled and disassembled, is thoroughly effectual in operation, and is not likely to get out of order.

In Fig. 2 of the drawings I show a modified construction in which the cylinder is provided at its lower end with a two-part clip 14 to engage around the axle.

In Fig. 3 of the drawings I show another modified construction in which the two-part clip 15 is formed at one side of the lower end of the cylinder.

While I have herein shown and described a preferred form of my invention, I would have it understood that changes may be made in the form, proportion and construction of the several parts, without departing from the spirit of my invention and within the scope of the appended claim.

Having thus described my invention, I claim:

In a shock absorber of the class described, in combination, a cylinder, a plunger rod, a plunger attached to the rod, arranged to operate in the cylinder, of slightly less diameter than the bore of the cylinder and provided with openings for the passage of liquid therethrough, and a vertically movable valve to descend and close the openings of the plunger during an upward movement of the latter and to rise and clear said openings during a down stroke of the plunger, the plunger rod being provided with a sleeve which bears on the plunger, the said valve comprising a washer movable vertically and guided on said sleeve, a nut screwed to the rod and bearing against the under side of the plunger to clamp the plunger between said nut and the sleeve and a second nut screwed to the rod and bearing on the upper end of the sleeve to secure the same and also forming a stop to limit the upward movement of the valve.

In testimony whereof I affix my signature.

JOSEPH T. SCHMITT.